United States Patent
Okamoto

(10) Patent No.: US 9,448,417 B2
(45) Date of Patent: Sep. 20, 2016

(54) ILLUMINATION DEVICE AND PROJECTOR

(71) Applicant: SEIKO EPSON CORPORATION, Tokyo (JP)

(72) Inventor: Junichi Okamoto, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 130 days.

(21) Appl. No.: 14/174,385

(22) Filed: Feb. 6, 2014

(65) Prior Publication Data
US 2014/0232995 A1 Aug. 21, 2014

(30) Foreign Application Priority Data
Feb. 21, 2013 (JP) .................................. 2013-032095

(51) Int. Cl.
| | |
|---|---|
| *G02B 27/48* | (2006.01) |
| *G02B 27/09* | (2006.01) |
| *G03B 21/20* | (2006.01) |
| *H04N 9/31* | (2006.01) |

(52) U.S. Cl.
CPC ........... *G02B 27/48* (2013.01); *G02B 27/0927* (2013.01); *G02B 27/0961* (2013.01); *G03B 21/208* (2013.01); *H04N 9/3152* (2013.01); *H04N 9/3161* (2013.01)

(58) Field of Classification Search
CPC .. H04N 9/315; H04N 9/3152; H04N 9/3161; G02B 27/0927; G02B 27/0961; G02B 27/48

USPC ............ 353/30, 31, 38, 98, 99, 102; 359/15, 359/204.2, 490.2, 487.04, 487.05, 491.01, 359/634, 636, 638; 348/743–747, 750, 757, 348/758
See application file for complete search history.

(56) References Cited

U.S. PATENT DOCUMENTS

| | | | |
|---|---|---|---|
| 6,580,560 B1 * | 6/2003 | Benner, Jr. ............... | G02B 5/02 348/E9.026 |
| 2003/0039036 A1 * | 2/2003 | Kruschwitz et al. ......... | 359/707 |
| 2003/0179346 A1 * | 9/2003 | Mihara ........................... | 353/31 |
| 2008/0144148 A1 | 6/2008 | Kusunose et al. | |
| 2008/0259429 A1 | 10/2008 | Kamm et al. | |
| 2013/0100417 A1 * | 4/2013 | Yang et al. ..................... | 353/31 |

FOREIGN PATENT DOCUMENTS

| | | |
|---|---|---|
| JP | A-2008-152116 | 7/2008 |
| JP | A-2008-257242 | 10/2008 |
| JP | A-2009-216843 | 9/2009 |
| JP | A-2010-210854 | 9/2010 |

* cited by examiner

*Primary Examiner* — Sultan Chowdhury
(74) *Attorney, Agent, or Firm* — Oliff PLC

(57) ABSTRACT

An illumination device includes a light source device, a uniformization optical system which uniformizes the illuminance distribution of light from the light source device on a region to be illuminated, and a diffraction optical element which is provided in an optical path between the light source device and the uniformization optical system, and rotates around a predetermined rotation axis. The diffraction optical element includes a first region which forms a first illuminance distribution, and a second region which is provided at a position different from the first region around the rotation axis, and forms a second illuminance distribution different from the first illuminance distribution.

12 Claims, 12 Drawing Sheets

ILLUMINATION DEVICE AND PROJECTOR

BACKGROUND

1. Technical Field

The present invention relates to an illumination device and a projector.

2. Related Art

A projector has been hitherto known as one of display devices (for example, see. JP-A-2009-216843). For example, the projector modulates light from an illumination device using a light modulation device to form an image and projects the image onto a screen using a projection lens or the like.

As a light source of the illumination device, various light sources are used, and a coherent light source which emits light (coherent light) having coherence may be used. The coherent light source includes a solid-state light source using a laser diode (LD) or a super luminescence diode (SLD), a short-arc lamp light source, and the like. For example, in a projector using a laser light source, it is possible to sufficiently expand a color reproduction range since the wavelength band of the laser light source is narrow, and to achieve reduction in size or to reduce the number of constituent components.

On the other hand, if display is performed by a projector using a coherent light source, an observer who observes an image may recognize so-called speckle. Speckle is a pattern in which bright points and dark points are distributed in a striped pattern or a spotted pattern due to interference of light, gives a sense of glare to the observer, and gives a sense of discomfort during image viewing. For this reason, a technique which makes speckle be less recognized (hereinafter, "reduces" speckle) is expected to be devised.

As one of techniques for reducing speckle, JP-A-2009-216843 suggests a technique which rotates a spot formed on a pupil surface of a projection lens around an optical axis on the pupil surface. According to the technique of JP-A-2009-216843, the angular distribution of light rays entering respective points on a screen temporally changes, and the pattern of speckle temporally changes. As a result, the observer observes speckle in a superimposed (integrated) manner, and speckle is reduced.

In the above-described technique, in the course of effectively reducing speckle, there is room for improvement. For example, according to a method which moves a pupil image on a pupil surface, since there is no change in the pattern of the pupil image itself, it is not possible to sufficiently reduce speckle. Since it is necessary to increase the effective pupil (effective diameter) of the projection lens, an increase in the size of the projection lens and an increase in cost occur.

SUMMARY

An advantage of some aspects of the invention is that it provides an illumination device capable of effectively reducing speckle and a projector.

An illumination device according to a first aspect of the invention includes a light source device, a uniformization optical system which uniformizes the illuminance distribution of light from the light source device on a region to be illuminated, and a diffraction optical element which is provided in an optical path between the light source device and the uniformization optical system, and rotates around a predetermined rotation axis. The diffraction optical element includes a first region which forms a first illuminance distribution, and a second region which is provided at a position different from the first region around the rotation axis, and forms a second illuminance distribution different from the first illuminance distribution.

In this illumination device, since the illuminance distribution of light entering the uniformization optical system changes according to the rotation of the diffraction optical element, the angular distribution of light entering each point on the region to be illuminated temporally changes. The uniformization optical system uniformizes the illuminance distribution in the region to be illuminated without depending on the illuminance distribution of light from the diffraction optical element. As a result, in this illumination device, the region to be illuminated can be illuminated with uniform brightness, and the angular distribution of light entering each point on the region to be illuminated temporally changes, thereby effectively reducing speckle.

The illumination device of the first aspect may include a light flux reduction optical system which is provided in an optical path between the light source device and the diffraction optical element, and reduces a light flux from the light source device.

In the illumination device of this configuration, since light passing through the light flux reduction optical system is likely to be caught by the diffraction optical element, for example, it is possible to reduce the size of the diffraction optical element.

The illumination device of the first aspect may include a collinating optical system which is provided in an optical path between the diffraction optical element and the uniformization optical system, and parallelizes light entering the uniformization optical system.

In the illumination device of this configuration, since light entering the uniformization optical system is parallelized, it is possible to suppress an increase in the incident angle of light to the uniformization optical system. For this reason, in this illumination device, it is possible to decrease light which is not caught by the uniformization optical system, and to suppress a loss of light.

In the illumination device of the first aspect, light emitted from the diffraction optical element may be caught by the uniformization optical system without depending on the rotation angle of the diffraction optical element.

In the illumination device of this configuration, since it is possible to allow light emitted from the diffraction optical element to be caught by the uniformization optical system, a loss of light is suppressed.

A projector according to a second aspect of the invention includes the illumination device of the first aspect, an image forming system which forms an image by light from the illumination device, and a projection system which projects the image formed by the image forming system.

In this projector, since speckle is less visible by an observer of an image, it is possible to express an image with high quality.

In the projector of the second aspect, the image forming system may include a first microlens which is provided for each of a plurality of pixels arranged in the region to be illuminated, and a second microlens which constitutes an afocal optical system along with the first microlens.

In the projector of this configuration, since change in the angular distribution of light, which represents an image, caused by the image forming system is suppressed, it is possible to control the angular distribution of light entering each point on a projection surface, on which an image is projected, with high precision, thereby effectively reducing speckle.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment will be described. First, the outline of a projector of this embodiment will be described, and then, the details of respective units, such as an illumination device, of a projector will be described.

Figure 1:
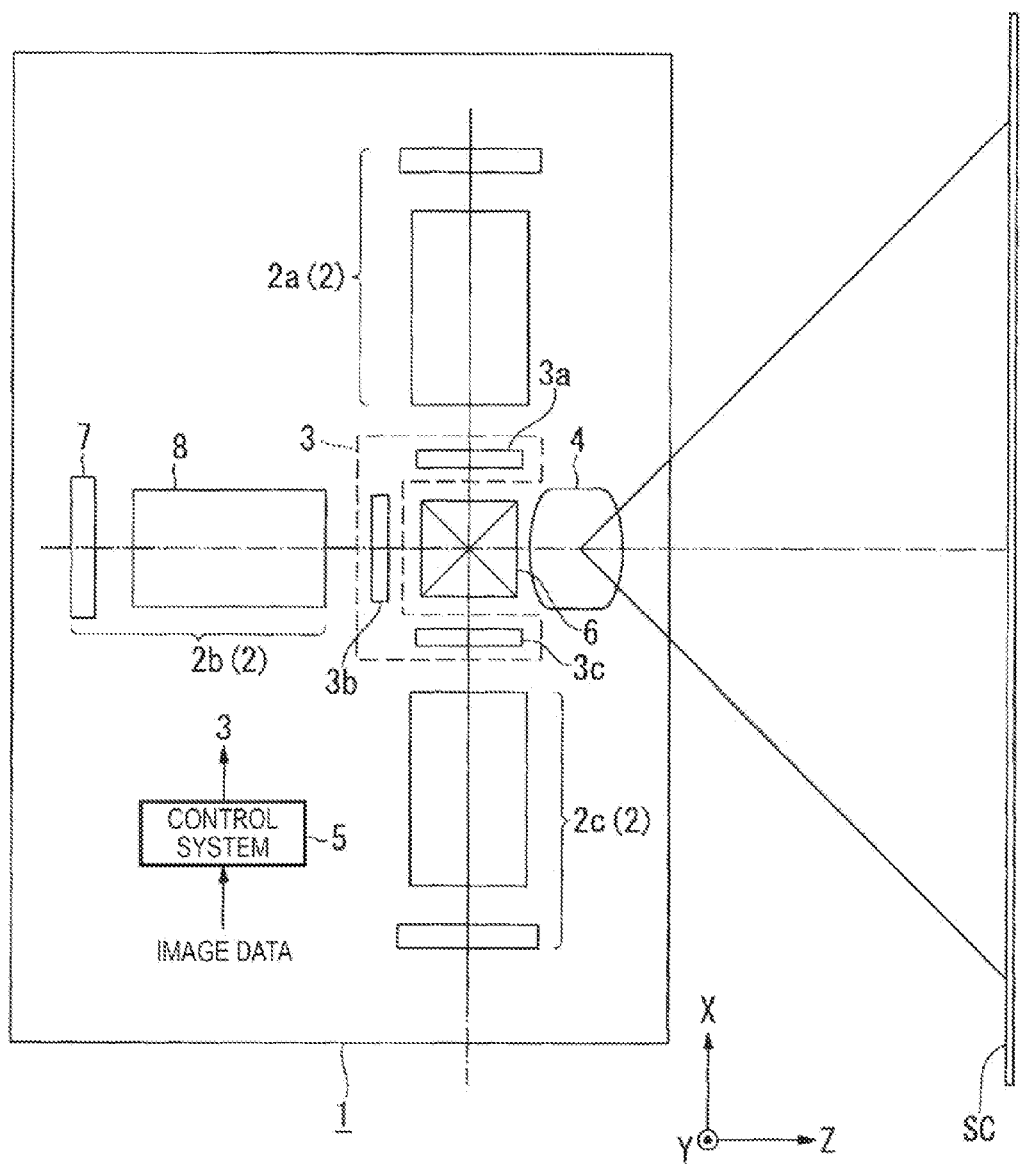
FIG. 1 is a diagram showing a projector 1 of a first embodiment.

FIG. 1 is a diagram showing a projector 1 of a first embodiment. The projector 1 forms an image according to image data supplied from a signal source, such as a DVD player or a PC, and projects the formed image on a projection surface SC (display screen), such as a screen or a wall.

The projector 1 includes an illumination system 2, an image forming system 3 which forms an image using illumination light from the illumination system 2, a projection system 4 which projects the image formed by the image forming system 3, and a control system 5 which controls the respective units of the projector 1. The projector 1 of this embodiment is a so-called three-plate projector which individually forms images of respective colors of red, green, and blue, and composes the formed images of the three colors by a color composition system 6, thereby expressing a full color image.

The illumination system 2 includes an illumination device 2a which emits red illumination light, an illumination device 2b which emits green illumination light, and an illumination device 2c which emits blue illumination light. These illumination devices have the same configuration, and each illumination device includes a light source device 7 and an illumination optical system 8.

The image forming system 3 includes an image forming apparatus 3a which forms a red image, an image forming apparatus 3b which forms a green image, and an image forming apparatus 3c which forms a blue image. The illumination devices for the respective colors of the illumination system 2 and the image forming apparatuses correspond to each other on a one-to-one basis.

The image forming apparatus for each color forms an image of each color using illumination light from the illumination device for each color, and emits image light according to the image of each color. For example, the image forming apparatus 3a for red forms a red image using illumination light (red light) from the illumination device 2a for red. The image forming apparatus 3a emits light (image light) according to an image. Similarly to the image forming apparatus 3a for red, the image forming apparatus for color other than red emits image light of the color according to the formed image of the color.

Image light of the respective colors emitted from the image forming system 3 enters the color composition system 6. The color composition system 6 is, for example, a dichroic prism, and includes two wavelength separation films which reflect or transmit incident light according to the wavelength of incident light. One wavelength separation film has a characteristic for transmitting red light and green light and for reflecting blue light. The other wavelength separation film has a characteristic for transmitting green light and blue light and for reflecting red light.

Respective color light which enters the color composition system 6 from the image forming system 3 is emitted from the color composition system 6 in a state of that travelling direction of each color light is aligned in the same direction by reflection or transmission in the wavelength separation films. Image light emitted from the color composition system 6 enters the projection system 4. The projection system 4 is a so-called projection lens, and magnifies and projects the image formed by the image forming system 3 on the projection surface SC.

Next, the respective units of the projector 1 will be described in more detail. In this embodiment, the illumination devices for the respective colors have the same configuration, and the image forming apparatuses for the respective colors have the same configuration. For this reason, the configuration of the system corresponding to the green image will be representatively described, and description of the systems corresponding to the images of other colors will be simplified or omitted.

Figure 2:
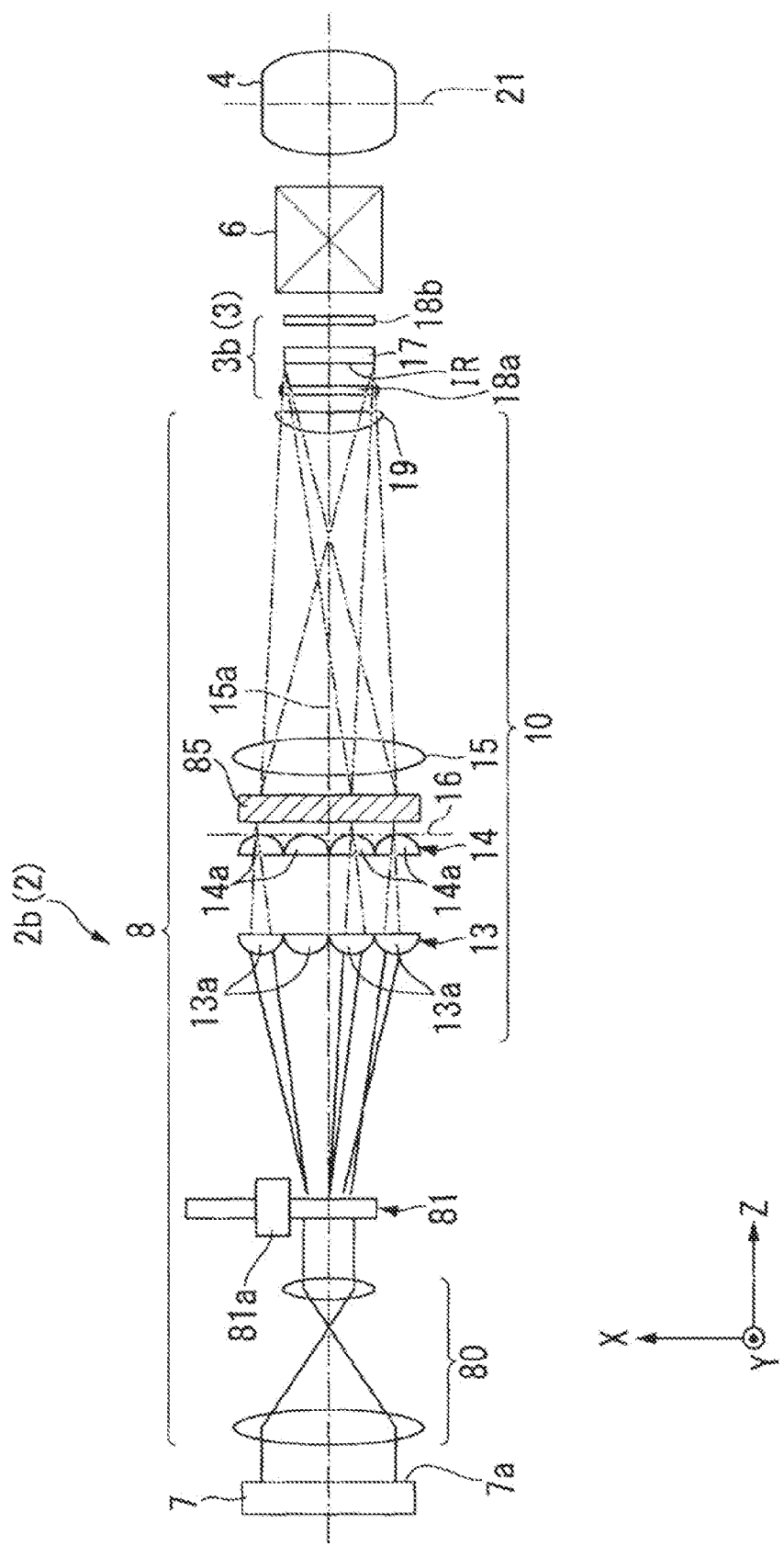
FIG. 2 is a diagram showing an illumination device, an image forming apparatus, a color composition system, and a projection system.

FIG. 2 is a diagram showing the illumination device 2b, the image forming apparatus 3b, the color composition system 6, and the projection system 4. The illumination device 2b illuminates a region, where a plurality of pixels are arranged, in the image forming apparatus 3b with substantially uniform brightness by a Kohler illumination method or the like. The illumination device 2b temporally changes the angular distribution of light entering each point on a region IR to be illuminated, thereby reducing speckle.

The illumination device 2b includes a light source device 7 and an illumination optical system 8. The illumination optical system 8 temporally changes the angular distribution of light entering each point on the region IR to be illuminated while uniformizing the illuminance distribution of light from the light source device 7 in the region IR to be illuminated (image forming apparatus 3b).

The light source device 7 includes, for example, a laser light source, and emits green laser light as light having coherence.

The illumination optical system 8 includes a light flux reduction optical system 80, a diffraction optical element 81, a uniformization optical system 10, and a field lens 19. In this embodiment, the uniformization optical system 10 includes a fly-eye lens 13, a fly-eye lens 14, and a superimposing lens 15. Light emitted from the light source device 7 enters the diffraction optical element 81 through the light flux reduction optical system 80, enters the uniformization optical system 10 through the diffraction optical element 81, and then enters the region IR to be illuminated through the uniformization optical system 10.

The light flux reduction optical system 80 is provided in an optical path between the light source device 7 and the diffraction optical element 81. The light flux reduction optical system 80 is an afocal optical system (both-side telecentric optical system), and reduces the beam diameter of light from the light source device 7.

The diffraction optical element 81 is provided in an optical path between the light source device 7 and the uniformization optical system 10. The diffraction optical element 81 is, for example, a computer generated hologram (CGH) or the like, and has a characteristic for diffracting light from the light source device 7. The diffraction optical element 81 of FIG. 2 is of a transmission type, and may be of a reflection type.

The diffraction optical element 81 is provided so as to be rotatable around a predetermined rotation axis 81a, and rotates around the rotation axis 81a with torque supplied from a driving unit (not shown), such as an electric motor. The rotation axis 81a is substantially set in parallel to, for example, the optical axis of the light flux reduction optical system 80.

Figure 3:
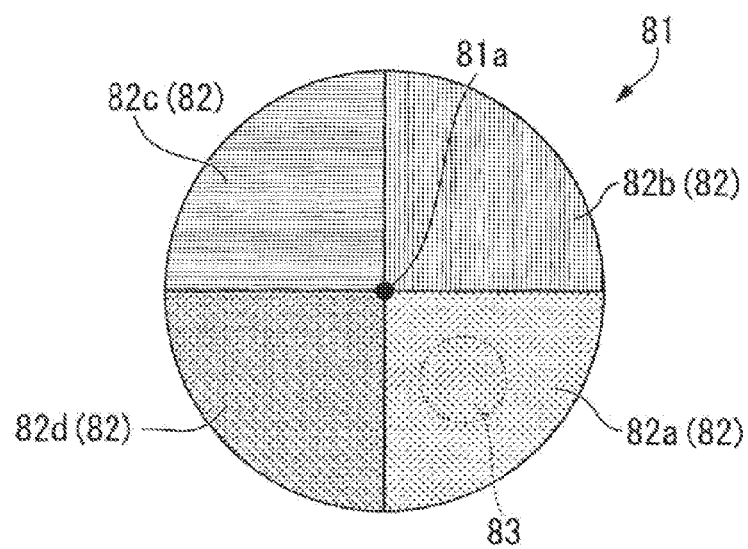
FIG. 3 is a diagram showing a configuration example of a diffraction optical element.

FIG. 3 is a diagram showing a configuration example of a diffraction optical element 81, and FIGS. 4A to 4D are diagrams showing an example of the pattern (illuminance distribution) of light which is formed by the diffraction optical element 81.

The diffraction optical element 81 of FIG. 3 includes a plurality of regions. Specifically, the diffraction optical element 81 includes a first region 82a, a second region 82b, a third region 82c, and a fourth region 82d. Hereinafter, the first region 82a, the second region 82b, the third region 82c, and the fourth region 82d are collectively referred to as a plurality of regions 82. Light from the light flux reduction optical system 80 enters an entrance region 83 on the diffraction optical element 81. A plurality of regions 82 are arranged in the circumferential direction around the rotation axis 81a in the diffraction optical element 81, and are different in the position in the circumferential direction around the rotation axis 81a. For this reason, a region overlapping the entrance region 83 among a plurality of regions 82 temporally changes with the rotation of the diffraction optical element 81 around the rotation axis 81a. While light from the light flux reduction optical system 80 enters one region among a plurality of regions 82, the diffraction optical element 81 is configured such that light does not enter other regions. For example, the center of the entrance region 83 is set at a position deviated from the rotation axis 81a, and the size of the entrance region 83 in the circumferential direction is smaller than the size of each region 82 in the circumferential direction.

As shown in FIGS. 4A to 4D, a plurality of regions 82 form light having patterns (illuminance distribution) different from each other. For example, the first region 82a forms a trapezoidal dark portion shown in FIG. 4A, and the second region 82b forms a double rectangular bright portion shown in FIG. 43. The third region 82c forms a rectangular bright portion and a rectangular dark portion shown in FIG. 4C, and the fourth region 82d forms a rectangular frame-shaped bright portion and a trapezoidal bright portion shown in FIG. 4D. In this embodiment, for example, the pattern which is formed by the first region 82a is a first illuminance distribution, and the pattern which is formed by the second region 82b is a second illuminance distribution different from the first illuminance distribution.

In the diffraction optical element 81 as described above, for example, though the first region 82a overlaps the entrance region 83 in the state of FIG. 3, if the diffraction optical element 81 rotates in the clockwise direction from this state, the second region 82b overlaps the entrance region 83, then, the third region 82c overlaps the entrance region 83, and subsequently, the fourth region 82d overlaps the entrance region 83. As a result, the pattern of light emitted from the diffraction optical element 81 temporally changes with the rotation of the diffraction optical element 81.

Light entering the diffraction optical element 81 is converted to light (hereinafter, referred to as pattern light) of the illuminance distribution according to the region overlapping the entrance region 83, and enters the uniformization optical system 10. That is, the illuminance distribution of light entering the uniformization optical system 10 temporally changes with the rotation of the diffraction optical element 81.

The uniformization optical system 10 shown in FIG. 2 includes the fly-eye lens 13, the fly-eye lens 14, and the superimposing lens 15.

The fly-eye lens 13 includes a plurality of lens elements 13a arranged on a predetermined plane in a two-dimensional manner. The predetermined plane on which the lens elements 13a are arranged is substantially parallel to a plane including a plurality of light emission regions 7a, through which light is emitted, in the light source device 7. For example, each of a plurality of lens elements 13a forms a plane (hereinafter, referred to as a first conjugate plane 16) which is optically conjugated with the entrance region 83 (see FIG. 3) of the diffraction optical element 81. Each of the lens elements 13a forms an light source image (secondary light source) on the first conjugate plane 16.

The fly-eye lens 14 includes a plurality of lens elements 14a arranged in a two-dimensional manner. A plane on which the lens elements 14a are arranged is arranged at or near the position of the first conjugate plane 16 formed by the fly-eye lens 13. A light source image is formed on each of the lens elements 14a of the fly-eye lens 14, and a light emission pattern including a plurality of light source images is formed on the fly-eye lens 14 (first conjugate plane 16).

The superimposing lens 15 superimposes light emitted from each of the lens elements 14a of the fly-eye lens 14 in the substantially same region (region IR to be illuminated). The superimposing lens 15 includes one or two or more lenses, such as a spherical lens or an aspherical lens, which are rotationally symmetrical around a predetermined axis. The predetermined axis corresponds to an optical axis 15a of the superimposing lens 15 (an optical axis of the illumination optical system 8), and is substantially perpendicular to the light emission region 7a of the light source device 7 and the first conjugate plane 16 formed by the fly-eye lens 13.

The illumination optical system 8 may be provided with a polarization conversion element 85 for aligning the polarization state of light entering the region IR to be illuminated. For example, the polarization conversion element 85 is provided in an optical path between the fly-eye lens 14 and the superimposing lens 15.

The illumination optical system 8 having the above-described configuration divides light, which is emitted from the light source device 7 and passes through the diffraction optical element 81, into a plurality of partial light fluxes for each lens element 13a of the fly-eye lens 13. The illumination optical system 8 superimposes the plurality of partial light fluxes divided by the fly-eye lens 13 on the region IR to be illuminated by the superimposing lens 15. For this reason, the illuminance distribution on the region IR to be illuminated is uniformized.

The image forming apparatus 3b of FIG. 2 is, for example, a transmission type liquid crystal light valve, and includes a liquid crystal panel 17 which has a plurality of pixels, a polarizing plate 18a which is arranged on the entrance side of the liquid crystal panel 17 (the light source device 7 side), and a polarizing plate 18b which is arranged on the emission side of the liquid crystal panel 17 (the projection system 4 side). The field lens 19 is arranged near the region IR to be illuminated on the entrance side of the polarizing plate 18a.

For example, the emission-side polarizing plate 18b is arranged such that the transmission axis is orthogonal to the transmission axis of the entrance-side polarizing plate 18a. The control system 5 controls the liquid crystal panel 17 on the basis of image data to control the polarization state of light passing through each pixel, thereby controlling transmittance of the polarizing plate 18a, the liquid crystal panel 17, and the polarizing plate 18b for each pixel. In this way, the image forming apparatus 3b forms an image specified in image data.

As described referring to FIG. 1, image light emitted from the image forming apparatus 3b enters the projection system 4 through the color composition system 6. The projection system 4 forms an image surface which is optically conjugated with the image forming apparatus 3b (object surface), and the image formed by the image forming apparatus 3b is projected on the projection surface SC arranged on the image surface.

In the projection system 4, a second conjugate plane 21 which is optically conjugated with the light source image (fly-eye lens 14) as a source of illumination light is formed. The second conjugate plane 21 is a so-called pupil surface, and in the second conjugate plane 21, the spots (referred to as a pupil image, an angle image, or the like) of a pattern according to the angular distribution of light emitted from the image forming apparatus 3b are formed.

When an image is formed using light having coherence as illumination, for example, a pattern (speckle) in which bright points and dark points are distributed in a striped pattern or a spotted pattern may be visible due to interference of image light passed through the projection surface SC. If speckle is visible by an observer of an image, speckle gives a sense of glare to the observer, and quality of image display is degraded.

As one of the methods of making speckle be less visible, a time multiplexing method which temporally changes the pattern of speckle on the screen is provided. In this method, the pattern of speckle changes at a frequency (for example, equal to or higher than 24 Hz) so as not to be visible by the observer, whereby contrast of temporally integrated speckle is degraded, and a specific light-dark pattern is less visible by the observer. For example, if the speckle pattern is changed among uncorrelated speckle patterns N times within $\frac{1}{24}$ seconds or less, contrast of speckle is degraded to $1/\sqrt{N}$.

Figure 5:
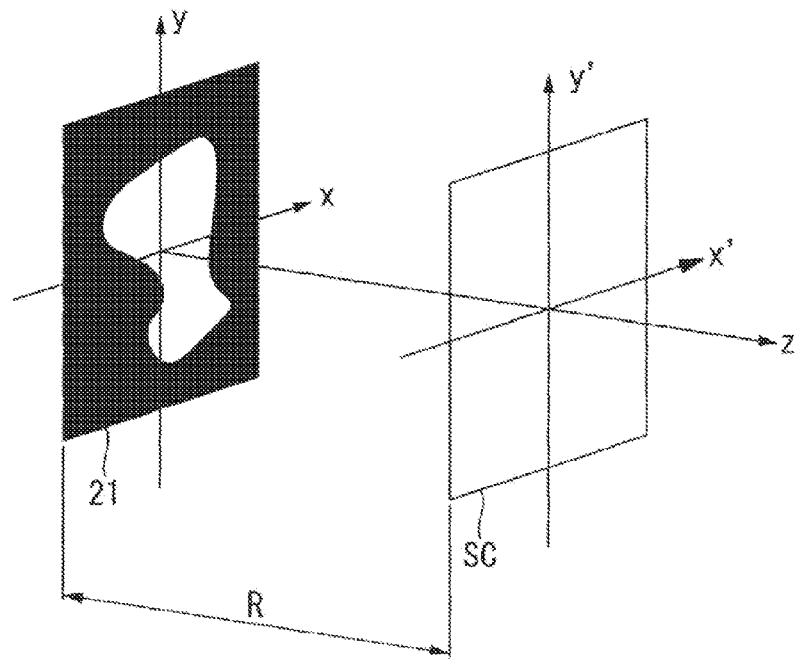
FIG. 5 is a diagram illustrating the definition of parameters in an equation for Fresnel diffraction.

The pattern of speckle will be described referring to FIG. 5 and Expression (1). FIG. 5 is a diagram illustrating the definition of parameters in an equation for Fresnel diffraction (Expression (1)).

$$u(x', y') = \frac{A}{i\lambda R} e^{ikR} \int\int f(x, y) e^{\frac{ik}{2R}[(x-x')^2+(y-y')^2]} dx dy \quad (1)$$

In FIG. 5, reference numerals x and y denote the coordinates on the second conjugate plane 21 (the pupil surface of the projection system 4), and reference numerals x' and y' denote the coordinates on the projection surface SC (screen). For convenience of description, it is assumed that the second conjugate plane 21 and the projection surface SC are parallel to the XY plane (see FIG. 2). The XY plane is a plane which is orthogonal to the optical axis 15a. Reference numeral R in FIG. 5 denotes the distance from the second conjugate plane 21 to the projection surface SC.

Expression (1) is a so-called equation for Fresnel diffraction, u(x',y') on the left side represents an amplitude distribution on the projection surface SC, A on the right side represents amplitude, i represents an imaginary unit, k represents a wave number (propagation coefficient), λ represents the wavelength of image light, and f(x,y) represents an aperture function. Since the pattern of speckle has a correspondence relationship with the amplitude distribution u(x',y') on the projection surface SC, it is inferred that the pattern of speckle changes according to the aperture function f(x,y). In the illumination device of this embodiment, the aperture function f(x,y) representing the light-dark pattern on the second conjugate plane 21 temporally changes to change the pattern of speckle, thereby reducing speckle.

Figure 6:
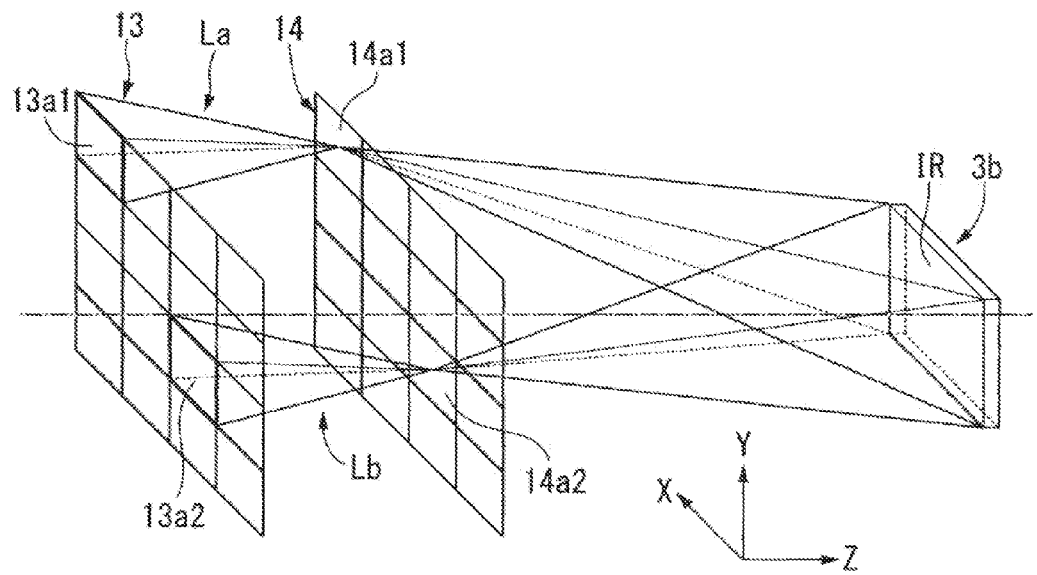
FIG. 6 is a diagram illustrating the principle of temporally changing an aperture function.

FIG. 6 is a diagram illustrating the principle of temporally changing the aperture function f(x,y). In FIG. 6, each of reference numeral 13a1 and reference numeral 13a2 denotes one lens element which is arbitrarily selected from a plurality of lens elements 13a of the fly-eye lens 13. Similarly, each of reference numeral 14a1 and reference numeral 14a2 denotes one lens element which is arbitrarily selected from a plurality of lens elements 14a of the fly-eye lens 14.

Light (hereinafter, referred to as a partial light flux La) emitted from the lens element 13a1 illuminates the entire region IR to be illuminated through the lens element 14a1. Light (hereinafter, referred to as a partial light flux Lb) emitted from the lens element 13a2 illuminates the entire region IR to be illuminated through the lens element 14a2.

In a state where the sum of the amount of light of the partial light flux La and the amount of light of the partial light flux Lb is constant, even when the amount of light of the partial light flux La and the amount of light of the partial light flux Lb change, brightness in the region IR to be illuminated does not change. Since the relative position of the lens element 14a1 with respect to the region IR to be illuminated and the relative position of the lens element 14a2 with respect to the region IR to be illuminated are different from each other, the angular distribution of light entering each point on the region IR to be illuminated changes with changes in the amount of light of the partial light flux La and the partial light flux Lb.

That is, the pattern (illuminance distribution, spatial distribution of light intensity) of light when entering the fly-eye lens 13 temporally changes, whereby the pattern of a light source image formed on the fly-eye lens 14 temporally changes. As a result, the pattern of a pupil image on the second conjugate plane 21 (the pupil surface of the projection system 4) optically conjugated with the light source image, that is, the aperture function f(x,y) temporally changes.

The illumination system 2 (illumination device 2b) rotates the diffraction optical element 81, thereby temporally changing the region overlapping the entrance region 83. For this reason, the illuminance distribution (pattern) of light entering the uniformization optical system 10 temporally changes. Then, the pattern of a light source image formed on the first conjugate plane 16 temporally changes, and the pattern (aperture function f(x,y)) of the pupil image on the second conjugate plane 21 optically conjugated with the first conjugate plane 16 temporally changes. Accordingly, the illumination device 2b can effectively reduce speckle.

Figure 4A:
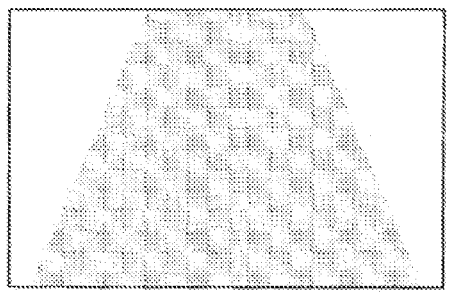
FIGS. 4A to 4D are diagrams showing an example of an illuminance distribution (pattern light) which is formed by a diffraction optical element.
Figure 4B:
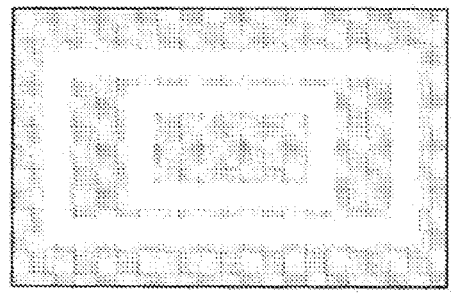
Figure 4C:
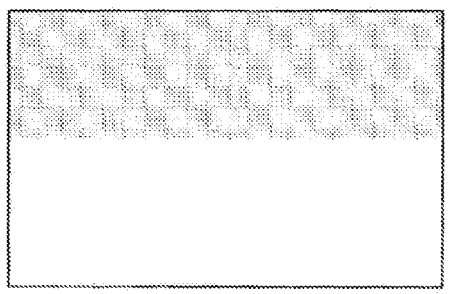
Figure 4D:
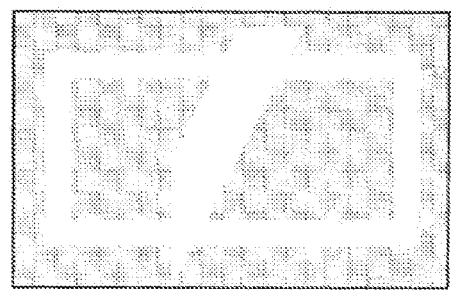

With the rotation of the diffraction optical element 81, the entrance region 83 apparently moves in the circumferential direction on the diffraction optical element 81. For example, as long as the entrance region 83 is kept inside the third region 82c, light having the pattern (illuminance distribution) shown in FIG. 4C is formed. However, a pattern to be formed rotates around the optical axis 15a (the optical axis of light emitted from the light source device 7) with the rotation of the diffraction optical element 81. As the pattern shown in FIG. 4C, when a bright portion is formed at a position out of the optical axis 15a, the bright portion moves around the optical axis 15a. Accordingly, even when the region overlapping the entrance region 83 does not change, the illuminance distribution (pattern) on the fly-eye lens 13 temporally changes with the rotation of the diffraction optical element 81. For example, as shown in FIG. 4C, if the diffraction optical element 81 is designed such that the bright portion is formed at a position out of the optical axis 15a, the pattern on the fly-eye lens 13 moves as well as rotates on the fly-eye lens 13 with the rotation of the diffraction optical element 81 even when the region overlapping the entrance region 83 does not change. For this reason, change in the pattern of the light source image formed on the fly-eye lens 14 increases, thereby effectively reducing speckle.

The illumination device 2b is configured such that light emitted from the diffraction optical element 81 is caught in the uniformization optical system 10 without depending on the rotation angle of the diffraction optical element 81. Preferably, it should suffice that the entire light emitted from the diffraction optical element 81 is caught in the uniformization optical system 10 without depending on the rotation angle of the diffraction optical element 81. That is, the illumination device 2b is configured such that the moving range of the pattern of light moving on a plane including the fly-eye lens 13 with the rotation of the diffraction optical element 81 falls inside the fly-eye lens 13. In this configuration, for example, there may be a margin of the size of the fly-eye lens 13 with respect to the moving range of the pattern of light on the fly-eye lens 13. The diffraction angle of the diffraction optical element 81 may be adjusted such that the pattern of light on the plane including the fly-eye lens 13 does not expand from the fly-eye lens 13.

Since the light flux reduction optical system 80 reduces the beam diameter of light from the light source device 7, light passing through the light flux reduction optical system 80 is less expandable from the diffraction optical element 81, and for example, the diffraction optical element 81 can be reduced in size. Since the entrance region 83 of the diffraction optical element 81 decreases, pattern light passing through the diffraction optical element 81 is easily caught by the fly-eye lens 13.

In the projector 1 including the illumination device 2b as described above, since speckle is less visible by the observer of the image, it is possible to suppress degradation of image display quality. In the projector 1, since the pattern of the pupil image is temporally changed by a device (illumination device 2b) outside the projection system 4, it is possible to avoid an increase in the size of the projection system 4, an increase in cost, and the like compared to a case where a device which adjusts the angular distribution of light to be projected is provided in the projection system 4. In the projector 1, since there is less need for expanding the effective diameter of the pupil surface of the projection system 4 compared to a system in which a pupil image having a fixed pattern is moved on the pupil surface of the projection surface SC, it is possible to avoid an increase in the size of the projection system 4, an increase in cost, and the like.

Second Embodiment

Figure 7:
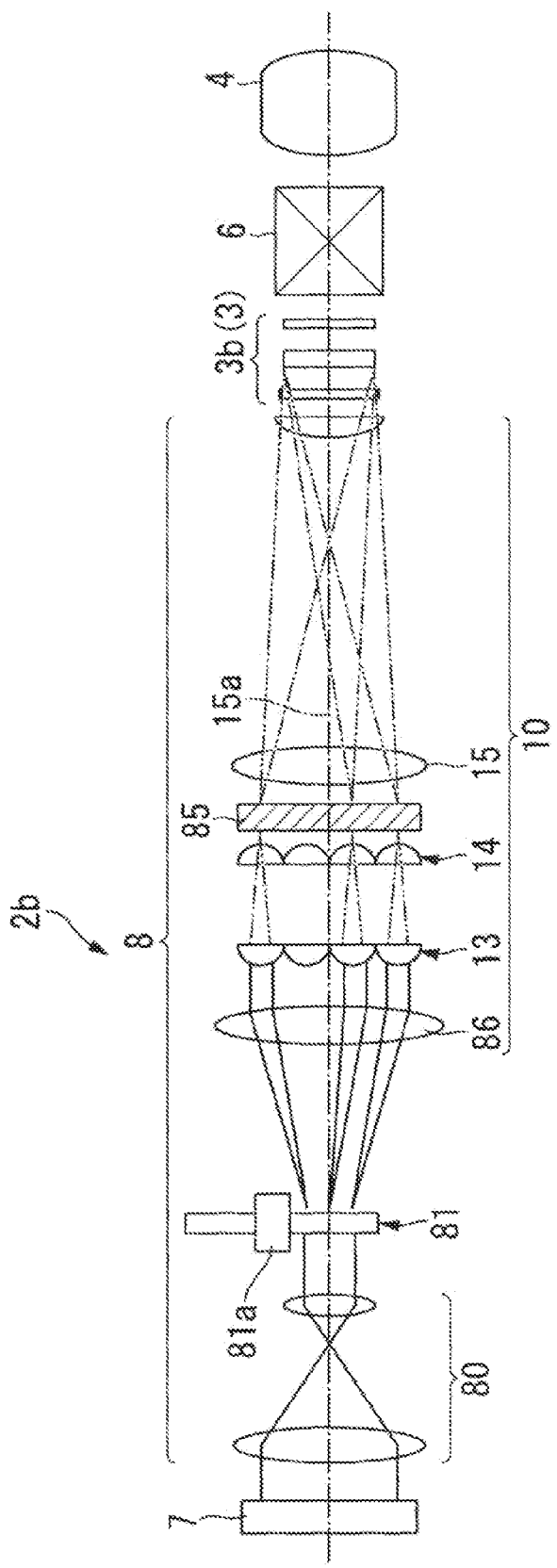
FIG. 7 is a diagram showing an illumination device of a second embodiment.

Next, a second embodiment will be described. FIG. 7 is a diagram showing an illumination device 2b (illumination system 2), an image forming apparatus 3b (image forming system 3), a color composition system 6, and a projection system 4 of a second embodiment. The illumination device 2b of this embodiment is different from that in the first embodiment in that a collimating optical system 86 is provided in an optical path between the diffraction optical element 81 and the uniformization optical system 10. The collimating optical system 86 parallelizes light which enters the uniformization optical system 10. For this reason, since it is possible to suppress the incident angle of light to the uniformization optical system 10 (fly-eye lens 13), and to decrease light which is not caught by the uniformization optical system 10, it is possible to decrease a loss of light.

Third Embodiment

Figure 8:
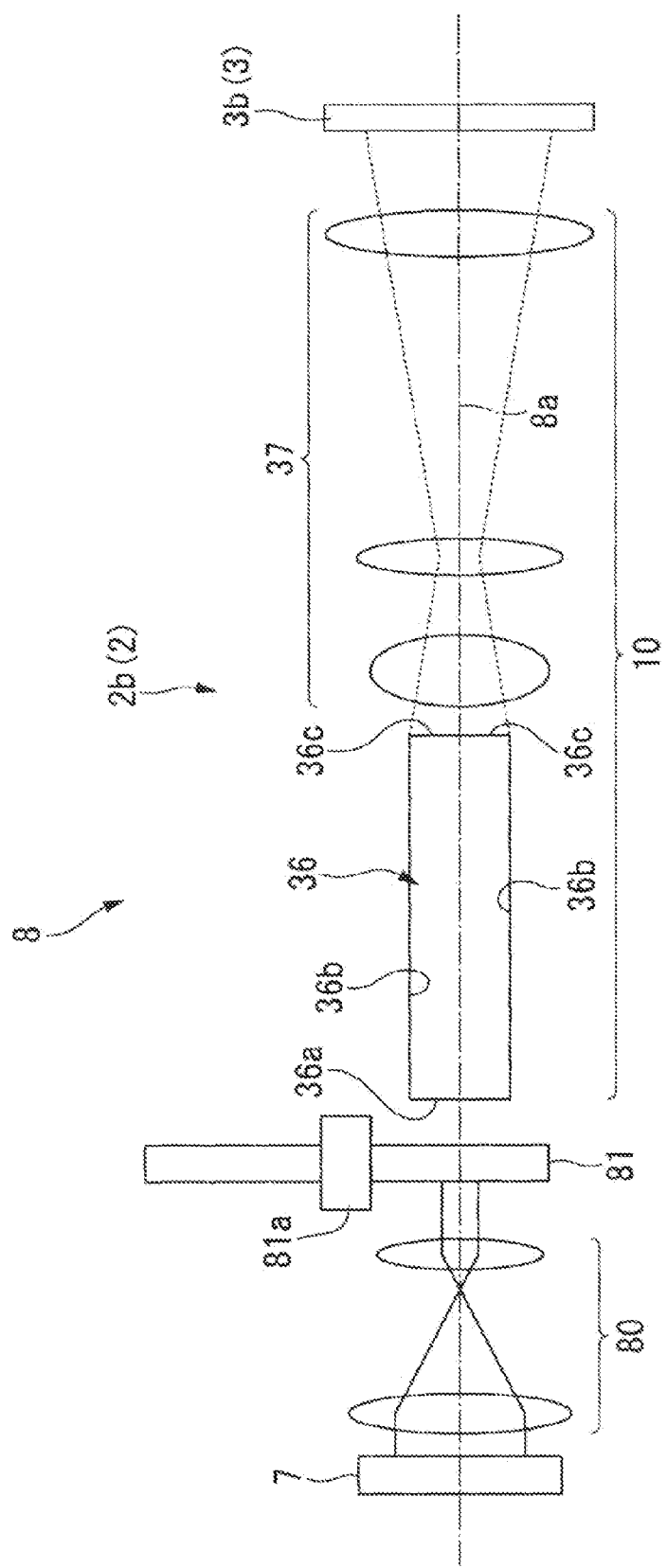
FIG. 8 is a diagram showing an illumination device of a third embodiment.

Next, a third embodiment will be described. FIG. 8 is a diagram showing an illumination device 2b and an image forming system 3 (image forming apparatus 3b) of a third embodiment. The illumination device 2b is different in the configuration of the uniformization optical system 10 from the first embodiment. In this embodiment, the uniformization optical system 10 includes an optical rod 36 and a relay optical system 37.

Figure 9:
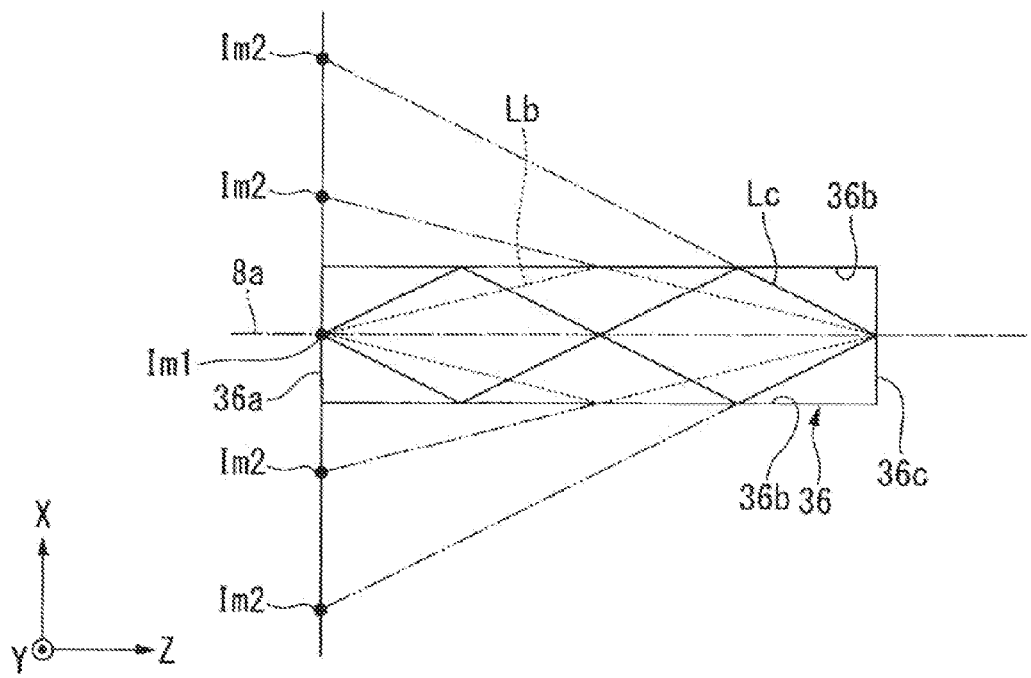
FIG. 9 is a diagram showing an optical rod.

FIG. 9 is a diagram showing the optical rod 36. The optical rod 36 is a so-called rod integrator (rod lens) or the like. It is assumed that the center axis of the optical rod 36 is an optical axis 8a of the uniformization optical system 10. The optical rod 36 is a square column-shaped optical member which extends in a direction parallel to the optical axis 8a. The optical rod 36 has an entrance end surface 36a, an inner surface 36b, and an emission end surface 36c. The entrance end surface 36a and the emission end surface 36c are substantially parallel to each other, and are substantially orthogonal to the optical axis 8a. The inner surface 36b is the inner surface of four lateral surfaces connecting the entrance end surface 36a and the emission end surface 36c, and is substantially parallel to the optical axis 8a.

The entrance end surface 36a is arranged, for example, near the entrance region 83 of the diffraction optical element 81 shown in FIG. 3 such that light emitted from the diffraction optical element 81 enters the entrance end surface 36a. A lens which condenses light emitted from the diffraction optical element 81 to let the light enter the entrance end surface 36a may be provided in an optical path between the diffraction optical element 81 and the entrance end surface 36a. The angular distribution of light entering the entrance end surface 36a becomes a distribution according to the region overlapping the entrance region 83 of the diffraction optical element 81.

Light entering the entrance end surface 36a of the optical rod 36 is guided to the emission end surface 36c by multiple reflection in the inner surface 36b. The number of reflections of light in the inner surface 36b differs among the angular components, and the number of reflections of the wide-angle component is greater than the number of reflections of the telescopic component. A plurality of light fluxes, which are different in the number of reflections, including a light flux for which the number of reflections in the inner surface 36b is zero, a light flux Lb shown in FIG. 9 for which the number of reflections is one, a light flux Lc for which the number of reflections is two, and the like are superimposed on the emission end surface 36c of the optical rod 36, and accordingly, the illuminance distribution on the emission end surface 36c is uniformized.

Figure 10:
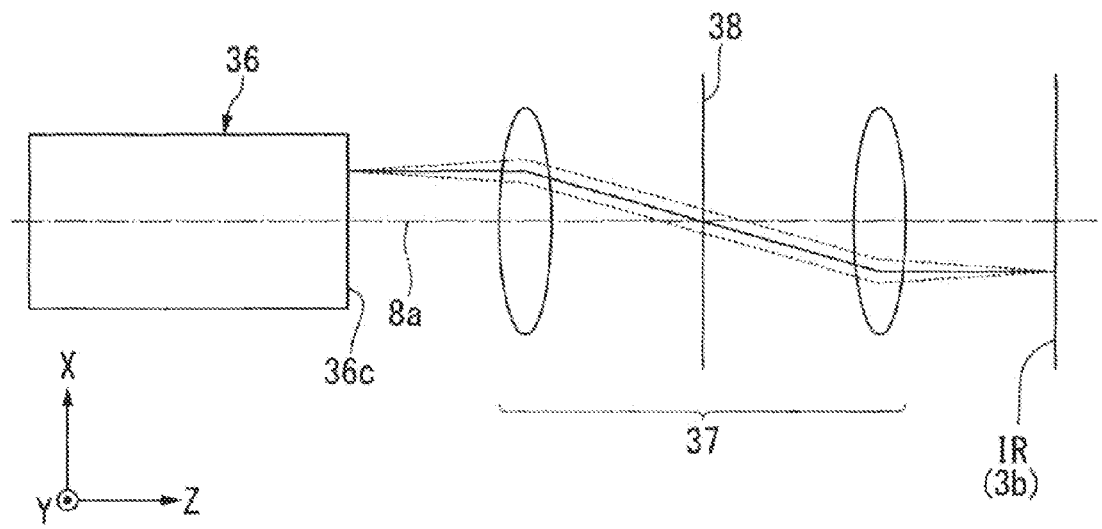
FIG. 10 is a diagram showing an optical rod and a relay optical system.

FIG. 10 is a diagram showing the optical rod 36 and the relay optical system 37. The relay optical system 37 forms a plane (region IR to be illuminated) which is optically conjugated with the emission end surface 36c of the optical rod 36. Since the illuminance distribution of light from the light source device 7 is uniformized on the emission end surface 36c of the optical rod 36, the illuminance distribution of light is uniformized in the region IR to be illuminated conjugated with the emission end surface 36c. In this way, the uniformization optical system 10 superimposes a plurality of light fluxes from the light source device 7 in the region IR to be illuminated, whereby the illuminance distribution in the region IR to be illuminated is made uniform.

On the other hand, a third conjugate plane 38 (so-called pupil surface) which is optically conjugated with the second conjugate plane 21 of the projection system 4 shown in FIG. 2 is formed in the relay optical system 37. A pupil image having a pattern according to the angular distribution of light emitted from each point on the emission end surface 36c of the optical rod 36 is formed on the third conjugate plane 38. The illumination device 2b temporally changes the angular distribution of light when entering the uniformization optical system 10 (optical rod 36) with the rotation of the diffraction optical element 81. For this reason, the pattern of the pupil image formed on the third conjugate plane 38 temporally changes, and the pattern of the pupil image on the second conjugate plane 21 of the projection system 4 temporally changes.

Figure 11:
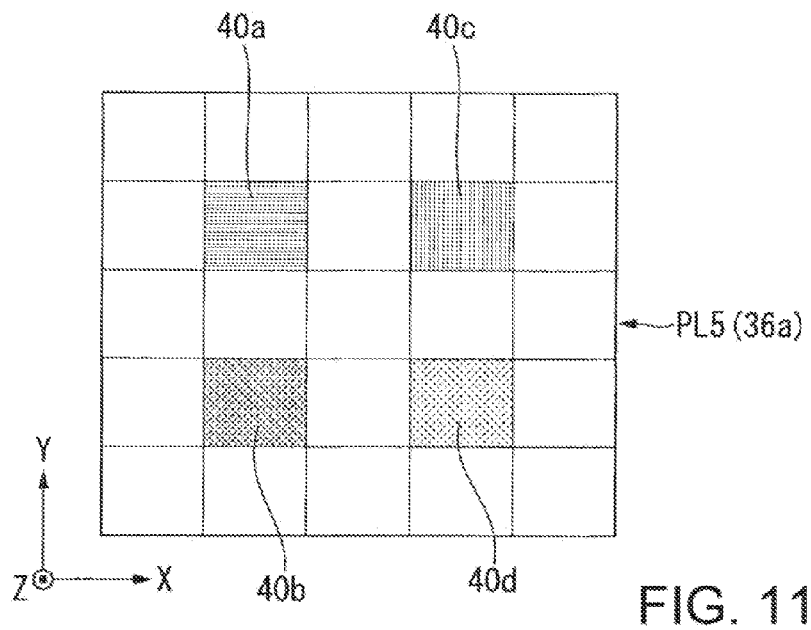
FIG. 11 is a diagram showing an example of pattern light which is formed by a diffraction optical element.
Figure 12:
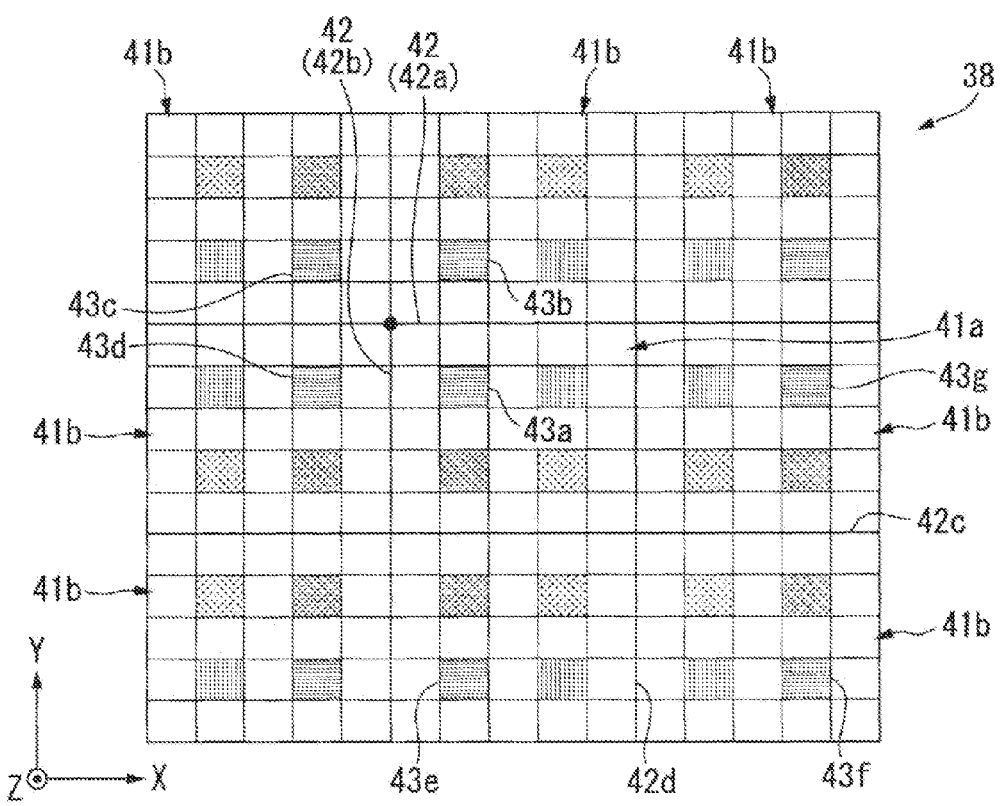
FIG. 12 is a diagram showing a pupil image which is formed on a third conjugate plane corresponding to pattern light.

FIG. 11 is a diagram showing an example of pattern light PL5 which is formed by the diffraction optical element 81. FIG. 12 is a diagram showing a pattern PL6 (pupil image) of spots formed in the third conjugate plane 38 corresponding to pattern light of FIG. 11. In FIG. 11, reference numerals 40a to 40d denote spots of light emitted from the diffraction optical element 81.

As shown in FIG. 9, a plurality of light fluxes which are different in the number of reflections in the inner surface 36b enter each point of the emission end surface 36c of the optical rod 36. For this reason, when observing from the emission side of the optical rod 36, it appears that a real image Im1 and a plurality of imaginary images Im2 of a light source image are arranged. In this example, a pattern 41a corresponding to the real image Im1 and a plurality of patterns 41b corresponding to a plurality of imaginary images Im2 as shown in FIG. 12 are arranged on the third conjugate plane 38. The pattern 41a and the patterns 41b are patterns (mirror image, inverted image) line-symmetric with respect to a boundary 42 corresponding to the inner surface 36b of the optical rod 36.

It is assumed that a region 43a which is conjugated with the spot 40a on the third conjugate plane 38 is arranged near a boundary 42a and a boundary 42b intersecting each other. A region 43b symmetrical to the region 43a with respect to the boundary 42a, a region 43c symmetrical to the region 43b with respect to the boundary 42b, and a region 43d symmetrical to the region 43c with respect to the boundary 42a are regions which are conjugated with the spot 40a. A region 43e symmetrical to the region 43a with respect to a boundary 42c, a region 43f symmetrical to the region 43e with respect to a boundary 42d, and a region 43g symmetrical to the region 43f with respect to the boundary 42c are regions which are conjugated with the light emission region 40a. For this reason, if brightness of the spot 40a changes, brightness of a number of regions (in the example of FIG. 12, nine regions) collectively changes. Accordingly, change in the pattern of the light source image on the third conjugate plane 38 increases. In the illumination device 2b of this embodiment, it is possible to increase change in the pattern of the pupil image on the third conjugate plane 38 compared to change in pattern light with the rotation of the diffraction optical element 81, and to effectively reduce speckle.

In the foregoing embodiments, a transmission type liquid crystal light valve is used as the image forming apparatus 3b. In the transmission type liquid crystal light valve, in general, a light shielding layer (black matrix) which covers a peripheral portion of a pixel P is provided. Since the light shielding layer shields a part of illumination light, use efficiency of illumination light is degraded. For this reason, there is a case where the transmission type liquid crystal light valve is provided with a microlens for each pixel. However, when the refractive power of the microlens is large, a speckle reduction effect by temporally changing a pupil image may decrease. In this case, the image forming apparatus 3b includes an afocal optical system, thereby suppressing a decrease in the speckle reduction effect.

Figure 13:
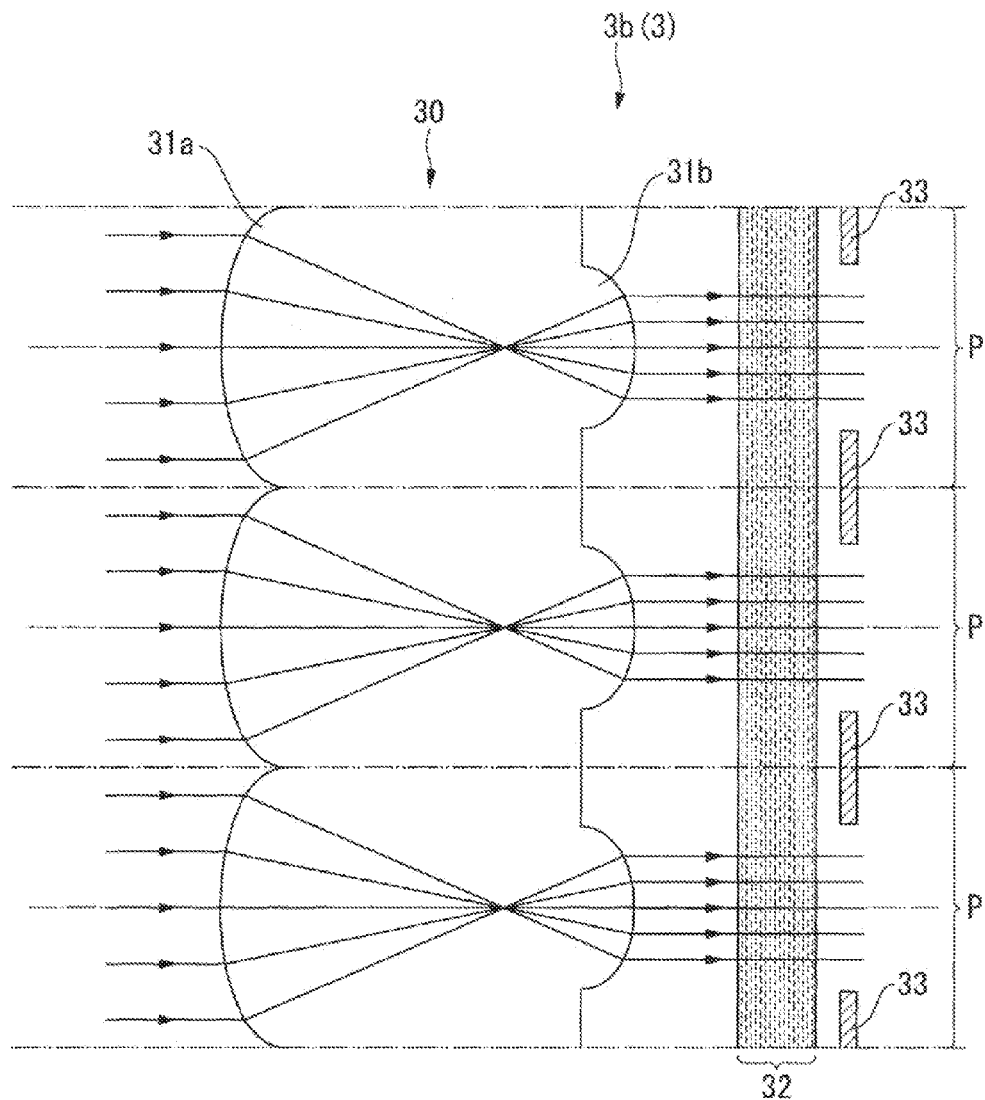
FIG. 13 is a diagram showing an example of an image forming apparatus.

A configuration example of the image forming apparatus 3b will be described. FIG. 13 is a diagram showing an example of the image forming apparatus 3b. The image forming apparatus 3b includes an afocal optical system 30, and the afocal optical system 30 includes a first microlens 31a and a second microlens 31b. In this example, the first microlens 31a and the second microlens 31b are a lens array which is provided on the same optical member, and the optical member is arranged on the entrance side of a liquid crystal layer 32.

The afocal optical system 30 of this example is of a so-called Kepler type, and the first microlens 31a and the second microlens 31b are convex lenses having positive power (refractive power). The first microlens 31a is provided on the entrance side of illumination light to the liquid crystal layer 32 for each pixel P. The second microlens 31b is arranged between the focal position of the first microlens 31a and the liquid crystal layer 32.

The image forming apparatus 3b includes a light shielding layer 33 (black matrix) which covers the peripheral portion of the pixel P, and the afocal optical system 30 reduces the beam diameter such that a light flux traveling toward the pixel P enters inside the pixel P. For this reason, in the image forming apparatus 3b, loss of light by the light shielding layer 33 decreases, and use efficiency of light increases.

Since the afocal optical system 30 converts a light flux entering each pixel P into a parallel light flux, it is possible to reduce the influence of the image forming apparatus 3b on the angular distribution of light passing through the image forming apparatus 3b. For this reason, it becomes easy to reflect the angular distribution of light to be temporally changed by the illumination device 2b in the pupil image on the second conjugate plane 21, thereby increasing the effect of making speckle be less visible.

Figure 14:
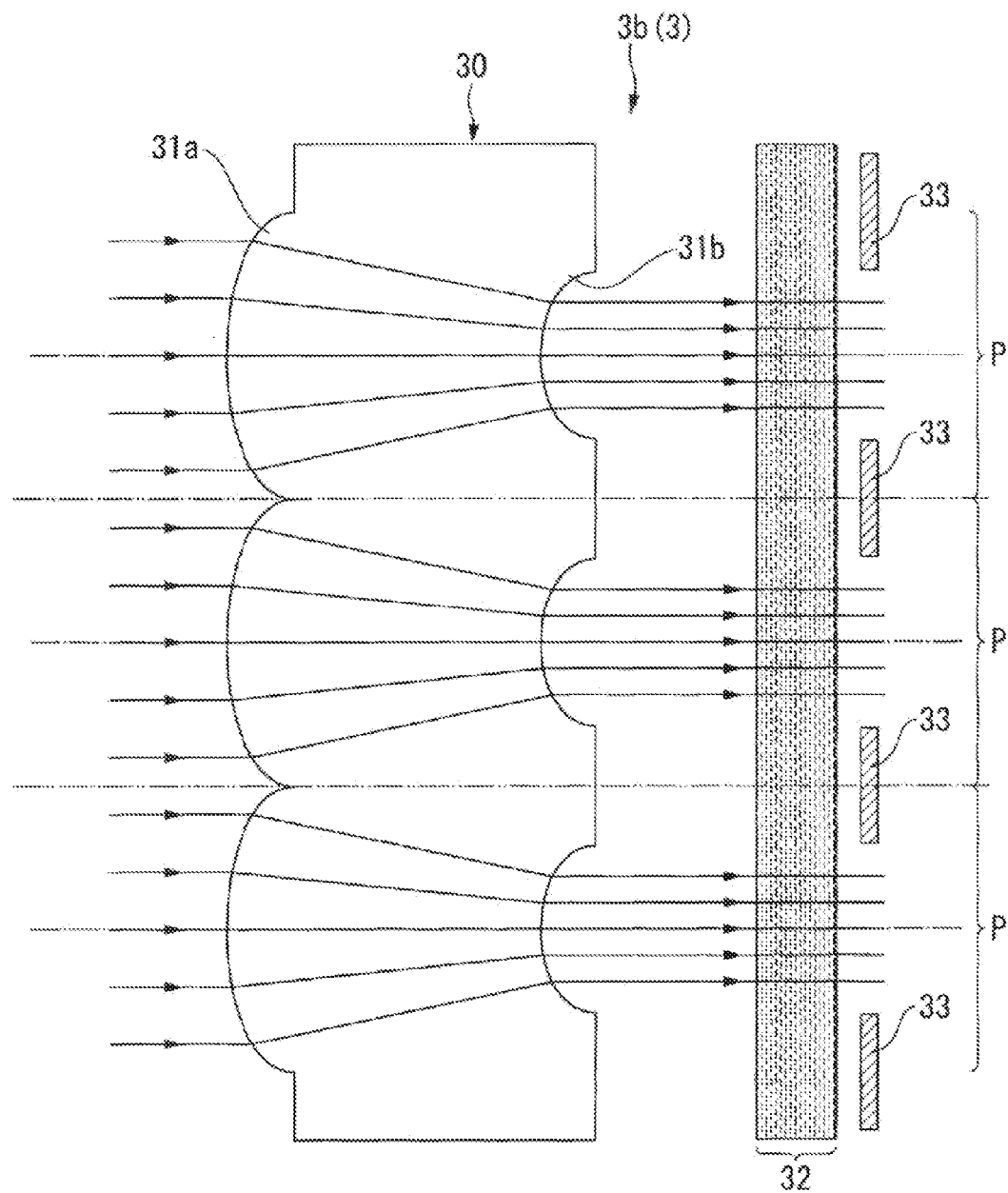
FIG. 14 is a diagram showing another example of an image forming apparatus.
Figure 15:
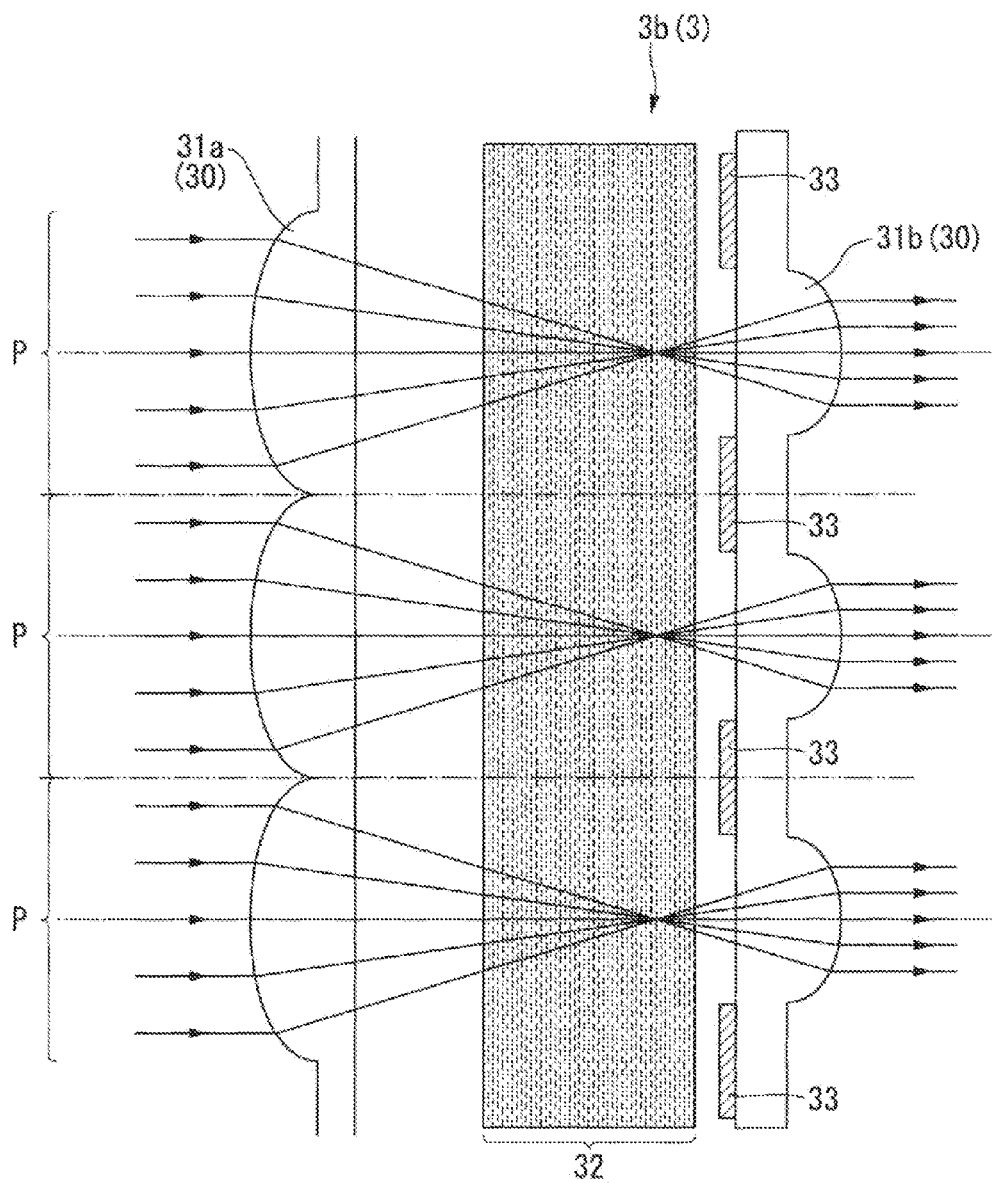
FIG. 15 is a diagram showing another example of an image forming apparatus.
Figure 16:
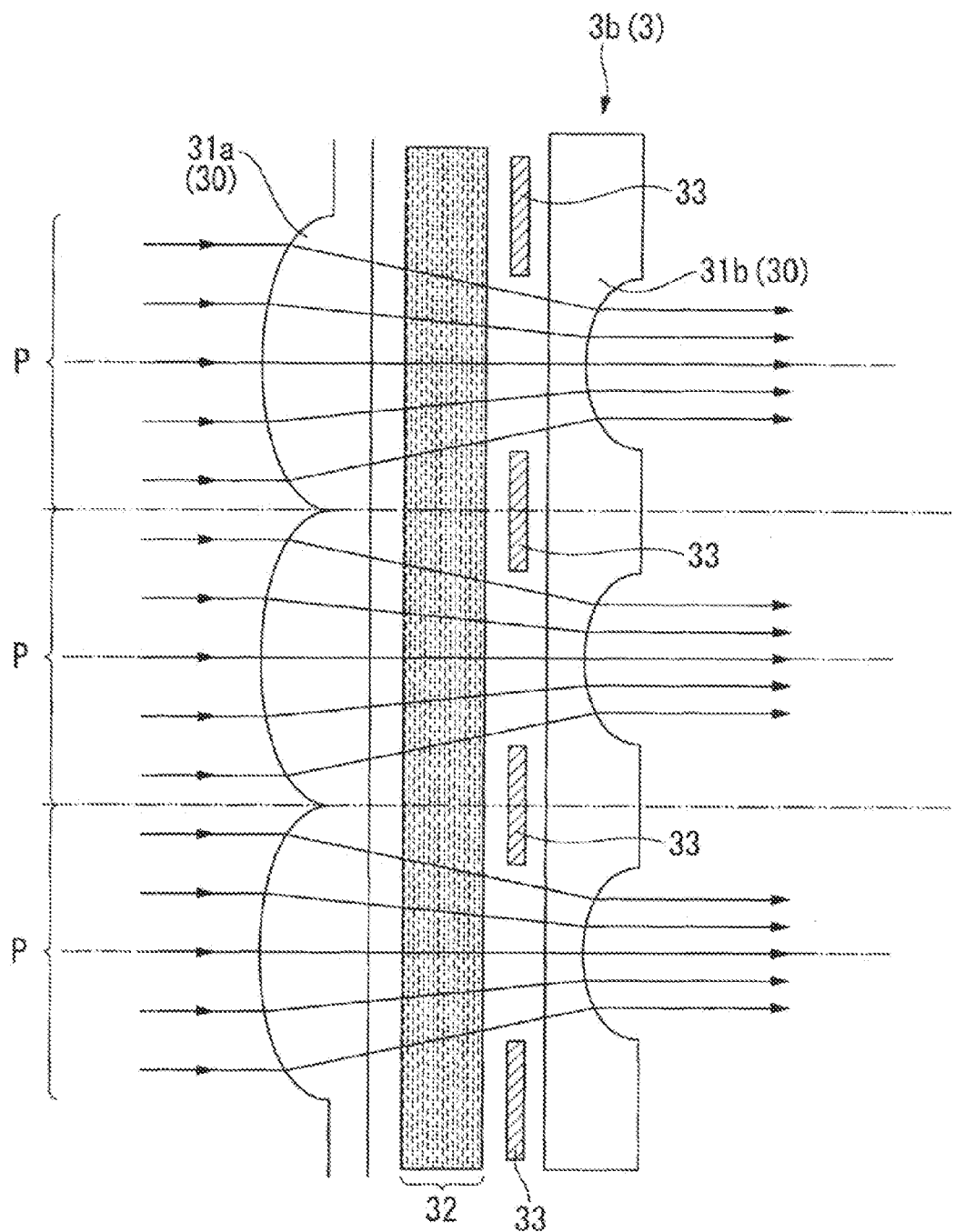
FIG. 16 is a diagram showing another example of an image forming apparatus.

FIGS. 14 to 16 are diagrams showing another example of the image forming apparatus 3b. In the image forming apparatus 3b shown in FIG. 14, the afocal optical system 30 is of a so-called Galileo type, the first microlens 31a is a convex lens having positive power, and the second microlens 31b is a concave lens having negative power. The Galileo type afocal optical system 30 can make the optical path length shorter than the Kepler type does.

In the image forming apparatus 3b shown in FIG. 15, the afocal optical system 30 is of a Kepler type, and the first microlens 31a and the second microlens 31b are convex lenses having positive power. In this example, the first microlens 31a and the second microlens 31b are a lens array which is provided in a separate optical member. The first microlens 31a is arranged on the entrance side of the liquid crystal layer 32, and for example, the focal position is arranged inside the liquid crystal layer 32. The second microlens 31b is arranged on the light emission side of the liquid crystal layer 32.

When the Kepler type afocal optical system 30 is used, as in this example, the optical path between the first microlens 31a and the second microlens 31b is used as the installation space of the liquid crystal layer 32, whereby, for example, the image forming apparatus 3b can be reduced in thickness compared to the case in which the Galileo type afocal optical system is used. Since the Kepler type afocal optical system 30 easily reduces the beam diameter of light when passing through the aperture of the light shielding layer 33, it is easy to reduce loss of light in the light shielding layer 33.

In the image forming apparatus 3b shown in FIG. 16, the afocal optical system 30 is of a Galileo type, the first microlens 31a is a convex lens having positive power, and the second microlens 31b is a concave lens having negative power. The first microlens 31a is arranged on the entrance side of the liquid crystal layer 32, and the second microlens 31b is arranged on the emission side of the liquid crystal layer 32. The image forming apparatus 3b can be significantly reduced in thickness compared to, for example, the Kepler type.

The technical scope of the invention is not limited to the foregoing embodiments. The requirements described in the foregoing embodiments can be appropriately combined. At least one of the requirements described in the foregoing embodiments may be omitted.

In the foregoing embodiments, although the illumination device is provided for each image forming apparatus, a single illumination device may be provided for a plurality of image forming apparatuses. For example, the illumination device may be configured to separate each color light component from light (simply, white light) including a plurality of color light components and to guide each color light component to the image forming apparatus for each color. As a light source device which generates white light, for example, a laser light source which emits red laser light, a laser light source which emits green laser light, and a laser light source which emits blue laser light may be provided, and laser light of the respective colors may be composed by a dichroic prism or a dichroic mirror. A light source device which generates white light may include a solid-state light source, such as a light emitting diode, a short-arc lamp light source, such as a metal halide lamp, or the like.

At least a part of the uniformization optical system 10 may be provided as a part of the light source device 7. For example, in the illumination device 2b shown in FIG. 2, the light source device 7 may be an optical unit which includes the fly-eye lens 13 and the fly-eye lens 14.

In the foregoing embodiments, although the projector 1 includes three transmissive liquid crystal light valves, a projector of different type in which images of respective colors are projected sequentially, and the images of the respective colors are temporally integrated, and the integrated image expressing a full color image is observed may be possible. The number of colors displayed on the projector 1 is not limited, and a monochromic image may be displayed or an image may be displayed using two or four or more color light components instead of expressing a full color image using color light components of three colors (three channels).

An optical modulator which is used in the image forming apparatus may be a reflection type liquid crystal device, a digital mirror device, or the like, instead of the transmissive liquid crystal device. The optical modulator may be a light valve by a high temperature poly-silicon (HTPS) technique, a liquid crystal on silicon (LCOS) technique, or the like, or may not include the light shielding layer 33 (black matrix) shown in FIGS. 13 to 16. When an optical modulator other than the liquid crystal device is used as the optical modulator, the field lens 19 may be omitted.

The entire disclosure of Japanese Patent Application No. 2013-032095, filed on Feb. 21, 2013 is expressly incorporated by reference herein.

What is claimed is:

1. An illumination device comprising:
   a light source device;
   a uniformization optical system which uniformizes the illuminance distribution of light from the light source device on a region to be illuminated; and
   a diffraction optical element which is provided in an optical path between the light source device and the uniformization optical system, and rotates around a predetermined rotation axis,
   wherein the diffraction optical element includes
      a first region having a first surface pattern which forms on the uniformization optical system a first illuminance distribution having a first geometrical pattern, the light from the light source device illuminating different portions of the first surface pattern during rotation of the diffraction optical element such that the first geometrical pattern of the first illuminance distribution on the uniformization optical system changes during rotation of the diffraction optical element while the light from the light source device is incident on the first region, and
      a second region having a second surface pattern and being provided at a position different from the first region around the rotation axis, the second region forming on the uniformization optical system a second illuminance distribution having a second geometrical pattern, the second geometrical pattern being different from the first geometrical pattern and the second surface pattern being different from the first surface pattern, the light from the light source device illuminating different portions of the second surface pattern during rotation of the diffraction optical element such that the second geometrical pattern of the second illuminance distribution on the uniformization optical system changes during rotation of the diffraction optical element while the light from the light source device is incident on the second region.

2. The illumination device according to claim 1, further comprising:
a light flux reduction optical system which is provided in an optical path between the light source device and the diffraction optical element, and reduces a light flux from the light source device.

3. The illumination device according to claim 1, further comprising:
a collimating optical system which is provided in an optical path between the diffraction optical element and the uniformization optical system, and parallelizes light entering the uniformization optical system.

4. The illumination device according to claim 1, wherein light emitted from the diffraction optical element is caught by the uniformization optical system without depending on the rotation angle of the diffraction optical element.

5. A projector comprising:
the illumination device according to claim 1;
an image forming system which forms an image using light from the illumination device; and
a projection system which projects the image formed by the image forming system.

6. A projector comprising:
the illumination device according to claim 2;
an image forming system which forms an image using light from the illumination device; and
a projection system which projects the image formed by the image forming system.

7. A projector comprising:
the illumination device according to claim 3;
an image forming system which forms an image using light from the illumination device; and
a projection system which projects the image formed by the image forming system.

8. A projector comprising:
the illumination device according to claim 4;
an image forming system which forms an image using light from the illumination device; and
a projection system which projects the image formed by the image forming system.

9. The projector according to claim 5, wherein
the image forming system includes
a first microlens which is provided for each of a plurality of pixels arranged in the region to be illuminated, and
a second microlens which constitutes an afocal optical system along with the first microlens.

10. The projector according to claim 6, wherein
the image forming system includes
a first microlens which is provided for each of a plurality of pixels arranged in the region to be illuminated, and
a second microlens which constitutes an afocal optical system along with the first microlens.

11. The projector according to claim 7, wherein
the image forming system includes
a first microlens which is provided for each of a plurality of pixels arranged in the region to be illuminated, and
a second microlens which constitutes an afocal optical system along with the first microlens.

12. The projector according to claim 8, wherein
the image forming system includes
a first microlens which is provided for each of a plurality of pixels arranged in the region to be illuminated, and
a second microlens which constitutes an afocal optical system along with the first microlens.

* * * * *